US009567220B2

(12) United States Patent
Jeong et al.

(10) Patent No.: US 9,567,220 B2
(45) Date of Patent: Feb. 14, 2017

(54) APPARATUS FOR MANUFACTURING CARBON NANOTUBE FIBERS (71) Applicant: SOONGSIL UNIVERSITY RESEARCH CONSORTIUM TECHNO-PARK, Seoul (KR)

(72) Inventors: Young Jin Jeong, Seoul (KR); Yeon Su Jung, Gangwon-do (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 198 days.

(21) Appl. No.: 14/384,380

(22) PCT Filed: Nov. 13, 2013

(86) PCT No.: PCT/KR2013/010289
§ 371 (c)(1),
(2) Date: Sep. 10, 2014

(87) PCT Pub. No.: WO2014/175524
PCT Pub. Date: Oct. 30, 2014

(65) Prior Publication Data
US 2016/0185601 A1 Jun. 30, 2016

(30) Foreign Application Priority Data
Apr. 22, 2013 (KR) .................. 10-2013-0044173

(51) Int. Cl.
C01B 31/02 (2006.01)
D01F 9/127 (2006.01)
D01F 9/133 (2006.01)

(52) U.S. Cl.
CPC ......... *C01B 31/0246* (2013.01); *D01F 9/1277* (2013.01); *D01F 9/133* (2013.01)

(58) Field of Classification Search
CPC .................................................. C01B 31/0246
See application file for complete search history.

(56) References Cited

U.S. PATENT DOCUMENTS 5,366,622 A * 11/1994 Geyer ...................... C02F 1/52
210/199
6,878,360 B1 4/2005 Ohsaki et al.
(Continued)

FOREIGN PATENT DOCUMENTS

KR 10-0360686 B1 2/2002
KR 10-0376202 B1 4/2002
(Continued)

Primary Examiner — Ryan Ochylski
(74) Attorney, Agent, or Firm — Revolution IP, PLLC (57) ABSTRACT Disclosed is an apparatus for manufacturing carbon nanotube fibers, which includes: a synthesis furnace that provides a space therein where a carbon nanotube fiber is synthesized; a raw material supplier that supplies a liquid-state raw material for a carbon nanotube into the synthesis furnace; a gas supplier that supplies a carrying gas into the synthesis furnace; a sub-synthesis furnace that is formed in the shape of a pipe and disposed at the upper portion in the synthesis furnace, and in which the raw material for a fiber flows along the inner side; a nozzle that sprays the raw material for a fiber supplied by the raw material supplier to the inner wall of the sub-synthesis furnace; and a heater that disposed along the outer side of the synthesis furnace.

10 Claims, 9 Drawing Sheets (56) References Cited

U.S. PATENT DOCUMENTS

| | | | |
|---|---|---|---|
| 8,182,782 B1 | 5/2012 | Moravsky et al. | |
| 8,309,227 B2 * | 11/2012 | Hitoe | B82Y 30/00 |
| | | | 428/372 |
| 8,834,827 B2 * | 9/2014 | Simard | B82Y 30/00 |
| | | | 423/447.1 |
| 9,102,525 B2 * | 8/2015 | Iyuke | B82Y 30/00 |
| 2011/0168942 A1 * | 7/2011 | Hitoe | B82Y 30/00 |
| | | | 252/74 |

FOREIGN PATENT DOCUMENTS

| | | |
|---|---|---|
| KR | 10-2002-0064535 A | 8/2002 |
| KR | 10-2003-0093541 A | 12/2003 |
| KR | 10-0892753 A | 4/2009 |
| KR | 10-2010-0119401 A | 11/2010 |
| KR | 10-1081417 B1 | 11/2010 |
| KR | 10-2011-0055159 A | 5/2011 |
| WO | 2004/039723 A1 | 5/2004 |

* cited by examiner

APPARATUS FOR MANUFACTURING CARBON NANOTUBE FIBERS

CROSS REFERENCE TO PRIOR APPLICATIONS

This application is a National Stage Application of PCT International Patent Application No. PCT/KR2013/010289 filed on Nov. 13, 2013, under 35 U.S.C. §371, which claims priority to Korean Patent Application No. 10-2013-0044173 filed on Apr. 22, 2013, which are all hereby incorporated by reference in their entirety.

TECHNICAL FIELD

The present invention relates to an apparatus for manufacturing carbon nanotube fibers, and more particularly to an apparatus for manufacturing carbon nanotube fibers which supplies a raw material for manufacturing a fiber such that it flows along the inner wall of a sub-synthesis furnace.

BACKGROUND ART

Carbon nanotube filaments can fall into a complex made by mixing a carbon nanotube with a polymer and one made of only a carbon nanotube.

The former is manufactured as a complex by melting a polymer, which is matrix, with a solvent or heat and then mixing it with a carbon nanotube, in which the technology of distributing the carbon nanotube is the most important technology, and it is a typical method for the latter to manufacture a filament through a post process after producing a carbon nanotube on a board. Also, the method has a problem in that the process of depositing a catalyst onto a board and continuous production of carbon nanotubes with a synthesis furnace closed are limited.

In the methods of manufacturing high-purity carbon nanotube fibers in the related art, a method of manufacturing fibers by directly spraying a solution with carbon nanotubes distributed into a container rotating with a polymer solution therein so that the polymer solution penetrates in between the carbon nanotube particles and bonds the carbon nanotubes is generally known.

When a solution is directly sprayed, as described above, however, there is a problem in that the polymer solution is distributed slowly between the carbon nanotubes and the efficiency of manufacturing carbon nanotube fibers is limited due to a limit in rotation speed of the container filled with the polymer solution. In addition, since there is polymer of around 30 wt % is in the manufactured carbon nanotube fibers, there is a limit in expression of excellent properties of the carbon nanotubes.

Korean Patent Publication No. 2012-0090383 can be exemplified as a prior art of the present invention.

DETAILED DESCRIPTION OF THE INVENTION

Technical Problem

The present invention has been made in an effort to provide an apparatus for manufacturing carbon nanotube fibers which makes a raw material of carbon nanotube fibers evaporate while flowing on the inner wall of a preheated fiber synthesis furnace.

Technical Solution

In order to achieve the object of the present invention, the present invention provides an apparatus for manufacturing carbon nanotube fibers, which includes: a synthesis furnace that provides a space therein where a carbon nanotube fiber is synthesized; a raw material supplier that supplies a liquid-state raw material that is supplied for a carbon nanotube into the synthesis furnace; a gas supplier that supplies a carrying gas into the synthesis furnace; a sub-synthesis furnace that is formed in the shape of a pipe and disposed at the upper portion in the synthesis furnace, and in which the raw material for a fiber flows along the inner side; a nozzle that sprays the raw material for a fiber supplied by the raw material supplier to the inner wall of the sub-synthesis furnace; and a heater that disposed along the outer side of the synthesis furnace.

The raw material supplier and the gas supplier may be configured to adjust the supply amount of a raw material.

Concave portions and convex portions may be formed on the inner side of the sub-synthesis furnace.

The nozzle may include: an inflow pipe formed in the shape of a pipe and disposed with both ends inside and outside the synthesis furnace, respectively; and a plurality of spray pipes disposed toward the inner side of the synthesis furnace, at the end of the inflow pipe which is in the synthesis furnace.

The raw material supplier and the gas supplier may be connected to the end of the inflow pipe which is outside the synthesis furnace.

The inflow pipe and the spray pipes may be arranged at the right angle.

The inflow pipe may be disposed at the center of the synthesis furnace.

The ends of the plurality of spray pipes may be in close contact with the inner wall of the synthesis furnace.

The spray pipes may be the same in size.

The spray pipes may be spaced with the same angular distances.

Advantageous Effects

According to the present invention, since the liquid-state raw material supplied in the synthesis furnace evaporates while flowing along the entire inner wall of the sub-synthesis furnace, the evaporation rate of the raw material is high and the efficiency of manufacturing a fiber is improved.

DESCRIPTION OF THE DRAWINGS

FIG. (a) of 5 illustrates $I_G/I_D=50$ of the single-wall carbon nanotube and (b) illustrates $I_G/I_D=6$ of the multi-wall carbon nanotube.

MODE OF THE INVENTION

Hereinafter, exemplary embodiments of the present invention will be described with reference to the accompanying drawings.

Figure 1:
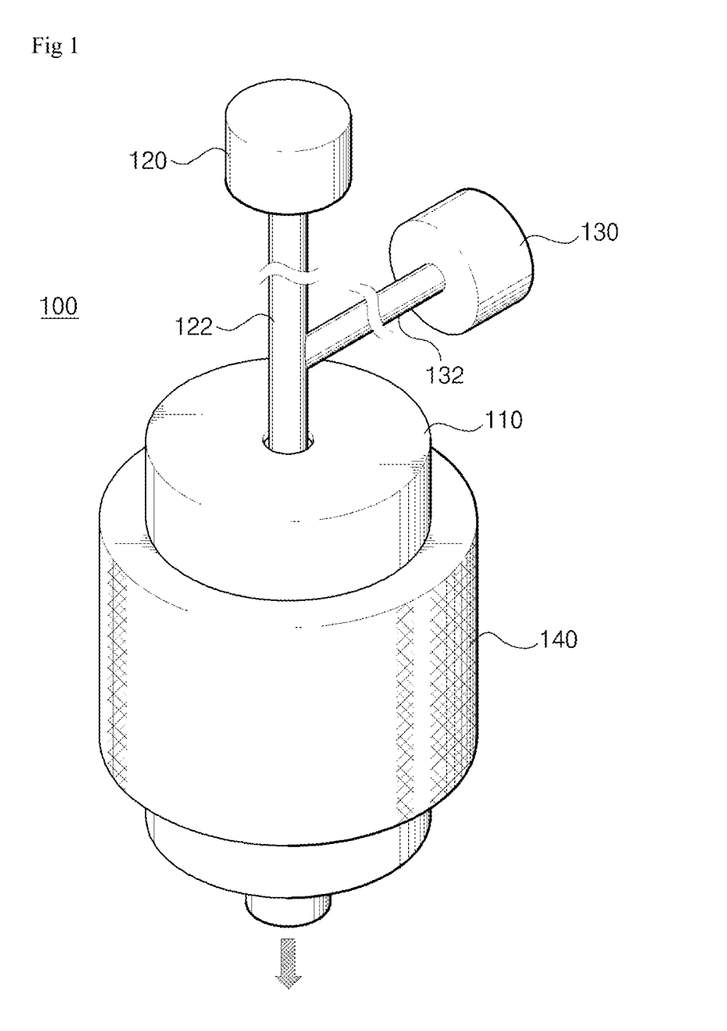
FIG. 1 is a view illustrating an example of an apparatus for manufacturing carbon nanotube fibers according to an embodiment of the present invention.

FIG. 1 is a perspective view illustrating an example of the configuration of an apparatus for manufacturing carbon nanotube fibers according to an embodiment of the present invention.

Referring to FIG. 1, an apparatus 100 for manufacturing carbon nanotube fibers according to an embodiment of the present invention includes a synthesis furnace 110, a raw material supplier 120, a gas supplier 130, a sub-synthesis furnace 112, a nozzle 150, and a heater 140.

First, the manufacturing of carbon nanotube fibers by the manufacturing apparatus according to the present invention can be performed by the method disclosed in the prior art, Korean Patent Publication No. 2012-0090383. Therefore, detailed description of the manufacturing process is not provided.

The synthesis furnace 110 provides a space therein where a carbon nanotube fiber is synthesized.

The synthesis furnace 110 may be a cylinder, but the shape and size may be set in various ways according to the need of a user.

The raw material supplier 120 and the gas supplier 130 are connected to the synthesis furnace 110 for synthesis of a carbon nanotube fiber.

The raw material supplier 120 supplies a raw material for synthesis of a carbon nanotube fiber to the synthesis furnace 110. The raw material to be supplied may be in a liquid state. The raw material supplier 120 is connected with the synthesis furnace 110 through a predetermined first supply pipe 122. The central axis of the first supply pipe 122 may be matched with the central axis of the synthesis furnace 110.

The raw material supplier 120 may be configured to adjust the amount of a raw material to supply to the synthesis furnace 110, if necessary. To this end, a flow control valve (not illustrated) may be disposed.

The gas supplier 130 supplies a carrying gas that makes it easy to carry the evaporated material after a material supplied for synthesis of a carbon nanotube fiber evaporates.

The gas supplier 130 may be connected to the synthesis furnace 110 through a second supply pipe 132 connected to a side of the first supply pipe 122 connecting the raw material supplier 120 with the synthesis furnace 110. The gas supplier 130 may be configured to adjust the amount of a gas to supply to the synthesis furnace 110, if necessary. To this end, a flow control valve (not illustrated) may be disposed. The amount of a gas may be adjusted individually from the adjustment of the amount of a raw material to be supplied.

Figure 2:
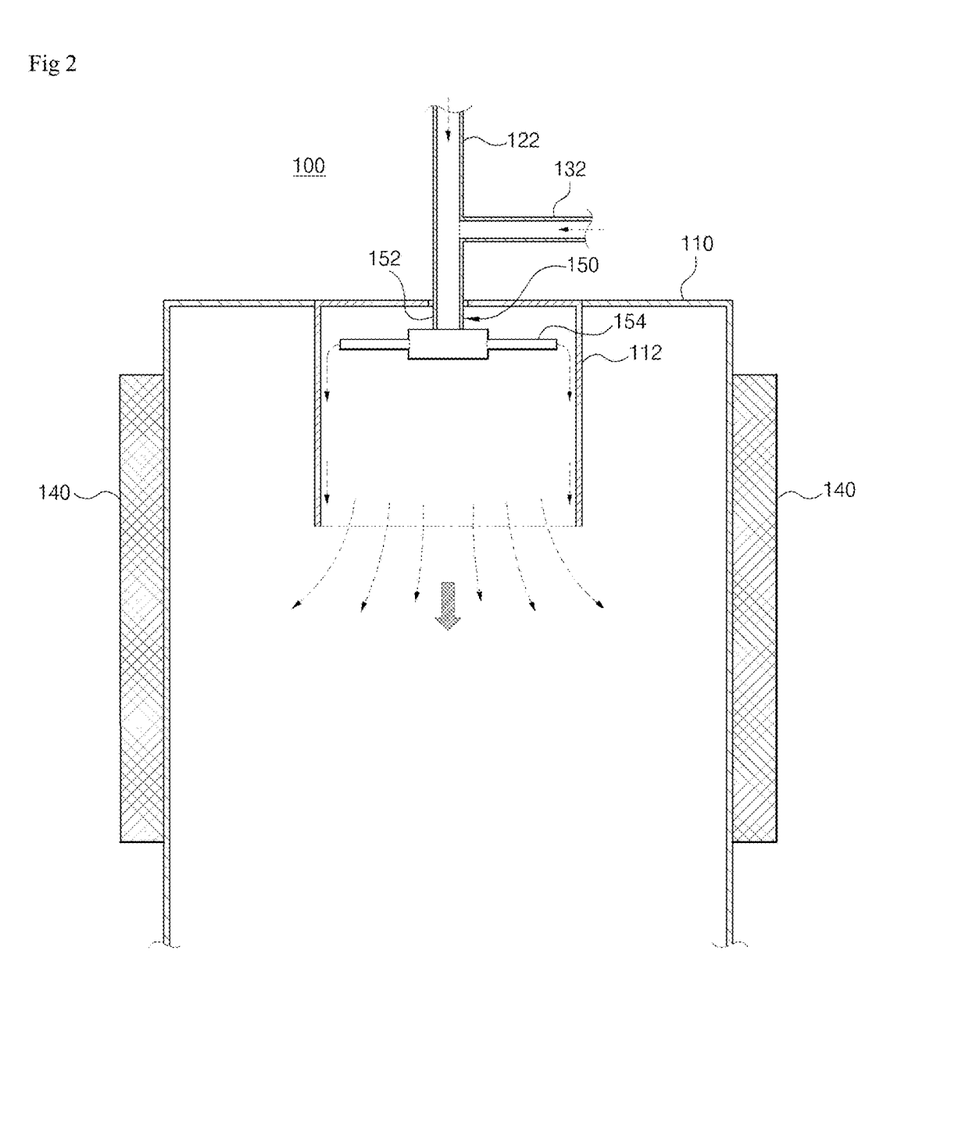
FIG. 2 is a cross-sectional view illustrating the configuration of the synthesis furnace and the sub-synthesis furnace illustrated in FIG. 1.

The sub-synthesis furnace 112, which is formed in the shape of a pipe, is disposed at the upper portion in the synthesis furnace 110. The sub-synthesis furnace 112 may be connected to an end of the first supply pipe 122. The central axis of the sub-synthesis furnace 112 may be matched with the central axis of the synthesis furnace 110. Further, the sub-synthesis furnace 112 may be larger in diameter than the first supply pipe 122, but is preferably smaller in diameter than the synthesis furnace 110. Further, the sub-synthesis furnace 112 is formed shorter in length than the first supply pipe 122. The synthesis furnace 110 may be formed as long as possible in length (for example, over five times longer in length than the sub-synthesis furnace) for easy evaporation of the supplied raw material even with incomplete heating due to a problem with the heater.

However, the diameter of the sub-synthesis furnace 112 may be set in consideration of evaporation of a raw material and the degree of heating by the heater 140 to be described below.

In order for the supplied raw material to easily evaporate in the sub-synthesis furnace 112, concave portions and convex portions are formed on the inner circumferential surface of the sub-synthesis furnace 112 to increase the evaporation area of the raw material. The supply speed of the raw material can increase with the increase of the evaporation area of the raw material. The cross-sectional shape of the concave portions and convex portions may be determined in various ways, depending on the need of a user, for example, a semicircle, a triangle, a rectangle, and the like.

Figure 3:
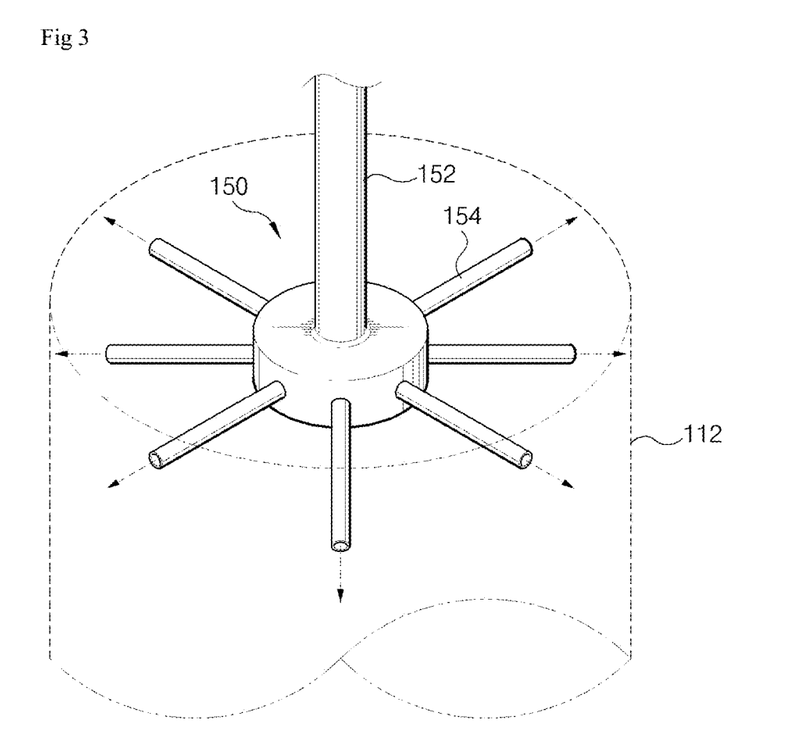
FIG. 3 is a perspective view illustrating an example of the configuration of a nozzle used in the present invention.

The nozzle 150 sprays the raw material and the carrying gas which are supplied from the outside, to the inner wall of the sub-synthesis furnace 112.

The configuration of the nozzle 150 is made as follows for uniform spray.

The nozzle 150 includes an inflow pipe 152 and a spray pipe 154.

The inflow pipe 152 has one end connected with the raw material supplier 120 through the first supply pipe 122 and the other end disposed in the sub-synthesis furnace 112. The central axis of the inflow pipe 152 may be matched with the central axis of the first supply pipe 122. Further, the inflow pipe 152 may be disposed on the central axis of the sub-synthesis furnace 112.

The spray pipe 154 is disposed at an end of the inflow pipe 152 and sprays the supplied raw material with the carrying gas to the inner wall of the sub-synthesis furnace 112. The spray pipe 154 may be disposed at the end of the inflow pipe 152, with the central axis facing the upper portion of the inner wall of the sub-synthesis furnace 112, at the right or larger angle from the central axis of the inflow pipe 152.

For uniform spray, a plurality of spray pipes 154 may be arranged with the same angular distance along the end of the inflow pipe 152.

Referring to FIG. 3, although eight spray pipes 154 are illustrated, more spray pipes may be provided, depending on the need of a user. In particular, the spray pipes 154 may be provided as many as possible so that the raw material can be uniformly sprayed throughout the inner wall of the sub-synthesis furnace 112 and then uniformly evaporate.

Further, the end of the spray pipe 154 may be close to the inner wall of the sub-synthesis furnace 112 within the range that does not interfere with spray of the raw material so that the raw material sprayed from the spray pipes 154 can flow down along the inner wall of the sub-synthesis furnace 112. The distance between the end of the spray pipe 154 and the inner wall of the sub-synthesis furnace 112 may correspond to the diameter of the spray pipes 154.

All of the spray pipes 154 may be the same in size.

A predetermined pressing pump (not illustrated) may be disposed in the inflow pipe 152 so that the spray pipe 154 can easily spray the raw material.

The heater 140 is disposed on the outer side of the synthesis furnace 110 and preheats the synthesis furnace 110 to heat, that is, evaporates the raw material flowing down along the inner wall of the sub-synthesis furnace 112. The heater 140 may be disposed around the outer side of the synthesis furnace 110 to uniformly apply heat.

The heater 140 may be implemented in various ways such as a gas heating type and an electric heating type, as long as it can uniformly apply heat. However, the electric heating type may be selected in consideration of convenience of use and production of wastes.

The heating temperature of the heater may be 80 to 1300° C.

The operation of the present invention with the configuration described above is described hereafter.

A worker starts the apparatus 100 for manufacturing carbon nanotube fibers to manufacture carbon nanotube fibers. When the apparatus is started, the heater 140 may operate and preheat first the synthesis furnace 110.

Thereafter, the raw material for manufacturing carbon nanotube fibers is supplied through the raw material supplier 120 and the carrying gas is supplied through the gas supplier 130.

The raw material and gas to be supplied is supplied toward the inner wall of the sub-synthesis furnace 112 through the inflow pipe 152 and the spray pipe 154 and the supplied raw material reaches the inner wall and then flows down along the inner wall.

Since the inside of the synthesis furnace 110 and the sub-synthesis furnace 112 are preheated at a predetermined temperature, the raw material evaporates while flowing down on the inner wall. The evaporating raw material may be synthesized into a fiber while being carried with the carrying gas.

According to the present invention, since the liquid-state raw material supplied in the synthesis furnace evaporates while flowing along the entire inner wall of the sub-synthesis furnace, the evaporation rate of the raw material is high and the efficiency of manufacturing a fiber is improved.

The present invention with the configuration described above can be used for manufacturing carbon nanotube fibers in various ways as follows.

EXAMPLE 1

The following is an example illustrating conditions for synthesizing a multi-wall carbon nanotube and a single-wall carbon nanotube, in which ethanol was used as the carbon source.

A. single-wall carbon nanotube: ferrocene of 2.2 wt %, thiophene of 0.4 wt %, hydrogen of 1,200 ml/min, temperature of 1,200 degrees B. multi-wall carbon nanotube: ferrocene of 2.2 wt %, thiophene of 1.4 wt %, hydrogen of 800 ml/min, synthesis furnace temperature of 1,100 degrees A liquid synthesized under the conditions was supplied to the synthesis furnace at a speed of 10 ml/h through a T-shaped liquid injection pipe, and in this experiment, the diameter of the synthesis furnace was 6 cm. The diameter of the synthesis furnace and the supply speed of the liquid may be increased to increase the amount of production, in which three or more liquid outlets may be provided instead of the T-shaped injection pipe in order to uniformly evaporate the liquid.

Figure 4:
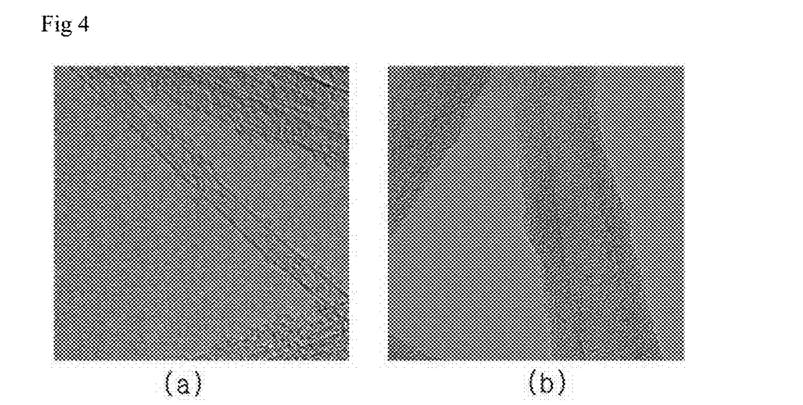
FIG. 4 is a transmission electron microscope picture of a carbon nanotube manufactured by the apparatus according to the present invention, in which (a) illustrates a single-wall carbon nanotube and (b) illustrates a multi-wall carbon nanotube.
Figure 5:
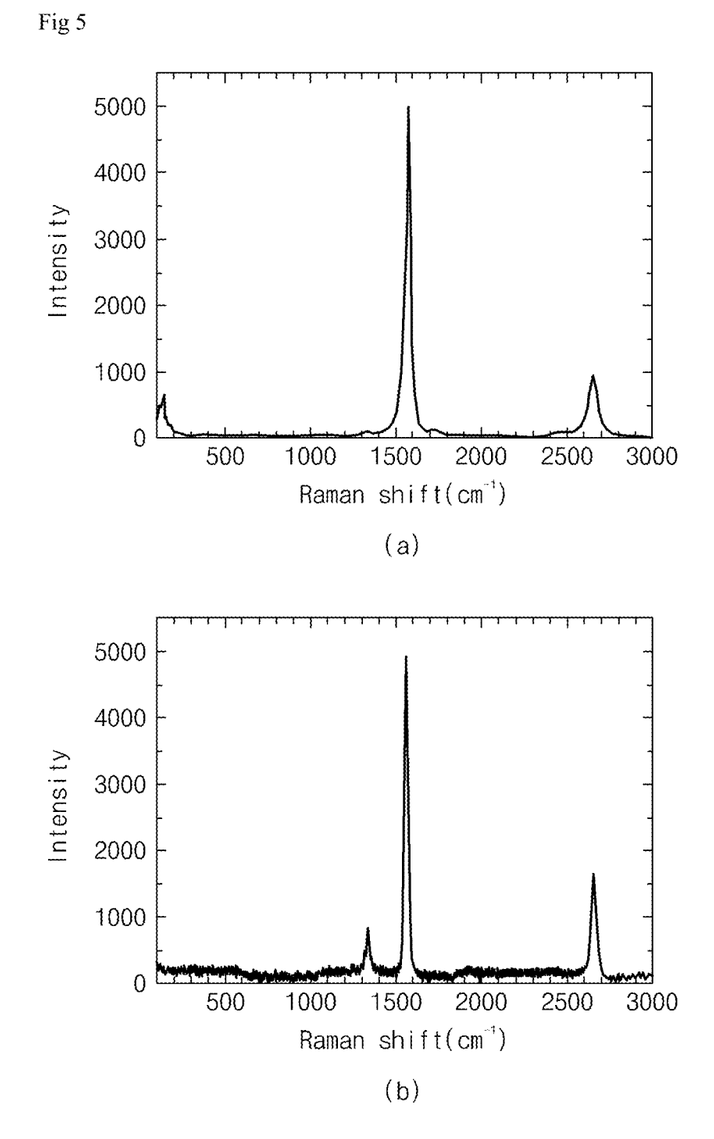
Figure 6:
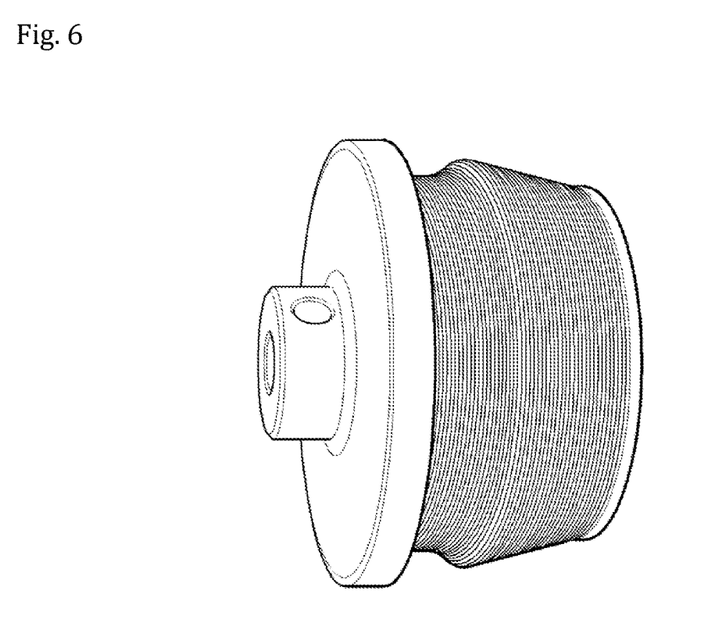
FIG. 6 is a picture illustrating a multi-wall carbon nanotube aggregate wound with a fiber.
Figure 7:
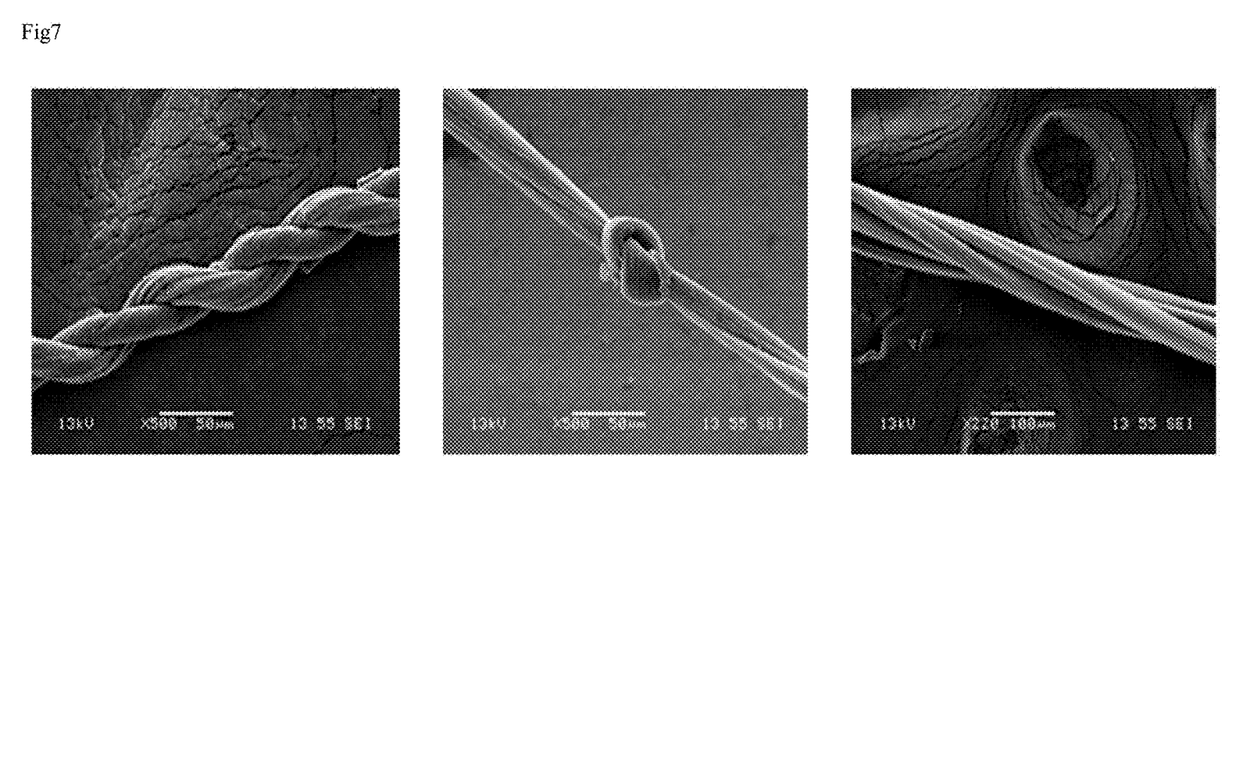
FIG. 7 is electron microscope pictures of a rope using the carbon nanotube aggregate illustrated in FIG. 6.

FIGS. 4 and 5 illustrate transmission electron microscope pictures of single-wall and multi-wall carbon nanotube aggregates synthesized under the conditions and the result of Raman analysis. In the Raman analysis data, the ratio of strengths $I_G/I_D$ measured on the G-band (around 1580 cm) and the D-band (around 1350 cm) is an indicator illustrating the percentage of completion of crystals. In general, $I_G/I_D$ of carbon nanotubes is about 1 [J Phys Chem B 2006; 110: 82508257].

However, in the carbon nanotube aggregates synthesized by the raw material injection method designed by the present invention, multi-walls of 6 and single-walls of 50 were measured. This proves that the present invention provides a method of more effectively synthesizing carbon nanotubes in comparison to the existing raw material injection methods.

EXAMPLE 2

Figure 8:
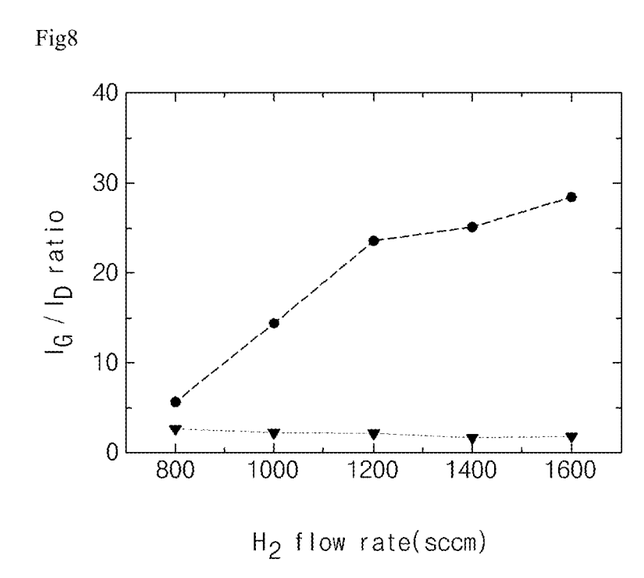
FIG. 8 is a graph illustrating changes in $I_G/I_D$ according to a hydrogen injection speed.

The kinds of raw materials were prepared, with acetone as the carbon nanotube supply source. The liquid A contained thiophene of 0.1 wt % and a catalyst, ferrocene of 1.0 wt % and the liquid B contained thiophene of 1.0 wt % and a catalyst, ferrocene of 1.0 wt %. Carbon nanotube aggregates were synthesized with different injection speeds of a hydrogen gas and Raman analysis was performed to measure the percentage of completion of crystals in the aggregates. According to the raw material injection method used in the present invention, since it is possible to individually inject a carbon raw material and a hydrogen gas, carbon nanotubes were synthesized with different injection speeds of the hydrogen gas. FIG. 8 illustrates the result and from which it can be seen that $I_G/I_D$ is changed by the relative ratio of the injection amount of hydrogen and the carbon raw material and the percentage of completion of crystals was high such that $I_G/I_D$ reached about 30. It can be seen that the carbon nanotube aggregate manufactured by the method of synthesizing it by evaporating a carbon raw material liquid has carbon nanotubes with very high crystallization in comparison to the existing methods.

EXAMPLE 3

Figure 9:
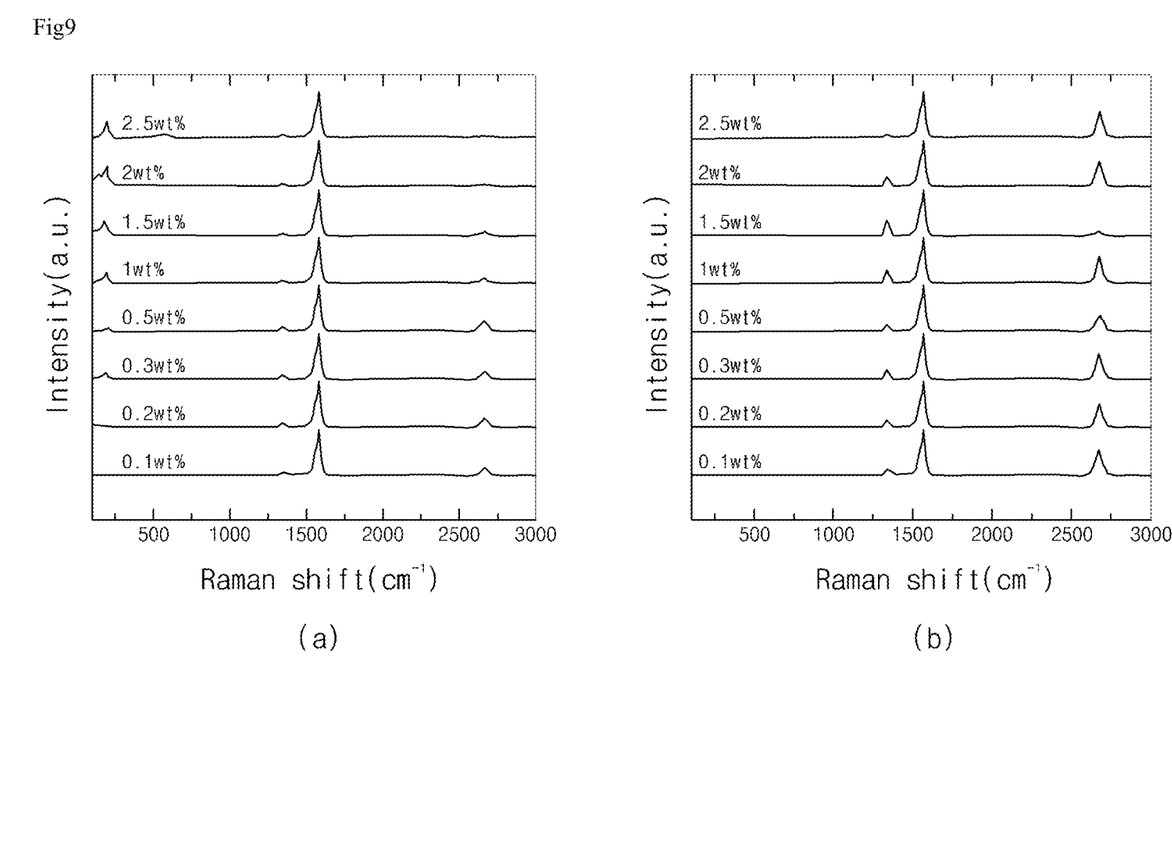
FIG. 9 is a graph illustrating the result of Raman analysis according to the concentration of a catalyst.
Figure 10:
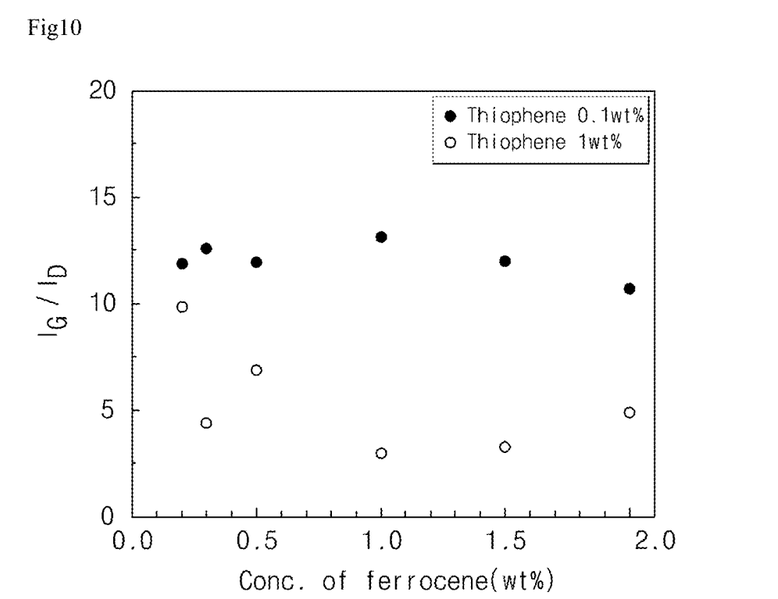
FIG. 10 is a graph illustrating changes in $I_G/I_D$ according to the concentration of a catalyst.

Ethanol was used as the carbon nanotube supply source, with ethanol of 98.0 wt % and thiophene of two concentrations of 0.1 wt % and 1.0 wt %. A carbon nanotube aggregate was synthesized while the concentration of the catalyst was increased. The injection speed of a hydrogen gas and the liquid injection speed were fixed at 1000 sccm and 10 mL/hr, respectively, and the temperature of the synthesis furnace was 1170 degrees. It is possible to see the result of Raman analysis on the synthesized carbon nanotube aggregate in FIG. 9. As illustrated in the figure, it can be seen that a single-wall carbon nanotube and a multi-wall carbon nanotube are synthesized only by adjusting the ratio of ferrocene and thiophene. Further, it can be seen in FIG. 10 that $I_G/I_D$ of a CNT fiber manufactured by the method of the present invention is very higher than those by other methods. This result is possible because the synthesis was performed by evaporating the liquid.

Since the carbon nanotube fiber manufactured by the apparatus according to the present invention uses the inherent properties of the carbon nanotubes, it can be used in various applications such as blocking of electromagnetic wave, absorption of electromagnetic waves, a sensor, a battery, medical treatment, a power cable, smart cloth, a field emission device, a solar cell electrode, a piezoelectric device, and an ultralight complex.

Although the present invention has been described with reference to the exemplary embodiments illustrated in the drawings, those are only examples and may be changed and modified into other equivalent exemplary embodiments from the present invention by those skilled in the art.

Therefore, the technical protective region of the present invention should be determined by the scope described in claims.

The invention claimed is:

1. An apparatus for manufacturing carbon nanotube fibers, comprising:
    a synthesis furnace having a space where a carbon nanotube fiber is synthesized;
    a raw material supplier to supply a liquid-state raw material for the carbon nanotube fiber into the synthesis furnace;
    a gas supplier to supply a carrying gas into the synthesis furnace;
    a sub-synthesis furnace formed in the shape of a pipe and disposed at an upper portion of the synthesis furnace, wherein the liquid-state raw material for the carbon nanotube fiber flows along an inner wall of the sub-synthesis furnace;
    a nozzle to spray the liquid-state raw material for the carbon nanotube fiber supplied by the raw material supplier to the inner wall of the sub-synthesis furnace; and
    a heater disposed along the outer side of the synthesis furnace, wherein
    concave portions and convex portions are formed on the inner wall of the sub-synthesis furnace.

2. The apparatus of claim 1, wherein the raw material supplier adjusts the supply amount of the liquid-state raw material for the carbon nanotube fiber, and the gas supplier adjusts the supply amount of the carrying gas.

3. The apparatus of claim 1, wherein the nozzle includes:
    an inflow pipe formed with a pipe shape, wherein one end of the inflow pipe is disposed inside of the synthesis furnace and the other end of the inflow pipe is disposed outside of the synthesis furnace; and
    a plurality of spray pipes disposed toward the inner wall of the sub-synthesis furnace, at the end of the inflow pipe which is in the synthesis furnace.

4. The apparatus of claim 3, wherein the raw material supplier and the gas supplier are connected to the end of the inflow pipe which is outside the synthesis furnace.

5. The apparatus of claim 3, wherein the inflow pipe and the spray pipes are arranged at a right angle.

6. The apparatus of claim 3, wherein the inflow pipe is disposed at the center of the synthesis furnace.

7. The apparatus of claim 3, wherein each end of the spray pipes is closely disposed at the inner wall of the sub-synthesis furnace.

8. The apparatus of claim 3, wherein the spray pipes are the same in size.

9. The apparatus of claim 3, the spray pipes are spaced with the same angular distances.

10. The apparatus of claim 8, the spray pipes are spaced with the same angular distances.

* * * * *